(12) United States Patent
Serentill et al.

(10) Patent No.: US 10,675,953 B2
(45) Date of Patent: Jun. 9, 2020

(54) SIDE WINDOW VISOR, A METHOD OF INSTALLATION, AND A MOTOR VEHICLE HAVING A SIDE WINDOW VISOR

(71) Applicant: Lund, Inc., Buford, GA (US)

(72) Inventors: Luis H. Serentill, Lawrenceville, GA (US); John A. Wargo, Atlanta, GA (US)

(73) Assignee: Lund, Inc., Buford, GA (US)

( * ) Notice: Subject to any disclaimer, the term of this patent is extended or adjusted under 35 U.S.C. 154(b) by 0 days.

(21) Appl. No.: 16/272,607

(22) Filed: Feb. 11, 2019

(65) Prior Publication Data

US 2019/0210433 A1    Jul. 11, 2019

Related U.S. Application Data

(63) Continuation of application No. 15/791,159, filed on Oct. 23, 2017, now Pat. No. 10,266,038, which is a continuation of application No. 14/679,131, filed on Apr. 6, 2015, now abandoned, which is a continuation of application No. 13/524,953, filed on Jun. 15, 2012, now Pat. No. 8,998,290.

(51) Int. Cl.
*B60J 3/00*    (2006.01)
*B60J 1/20*    (2006.01)
*B62D 65/02*    (2006.01)

(52) U.S. Cl.
CPC .............. *B60J 3/005* (2013.01); *B60J 1/2002* (2013.01); *B62D 65/024* (2013.01)

(58) Field of Classification Search
CPC ........ B60J 3/005; B60J 1/2002; B62D 65/024
See application file for complete search history.

(56) References Cited

U.S. PATENT DOCUMENTS

| | | |
|---|---|---|
| 2,281,840 A | 5/1942 | Hamilton |
| 2,859,680 A | 11/1958 | O'shei |
| 3,736,404 A | 5/1973 | Eisler |
| 3,866,527 A | 2/1975 | Katris |
| 4,039,221 A | 8/1977 | Eady |
| 4,089,256 A | 5/1978 | Furcini |
| 4,191,097 A | 3/1980 | Groen |
| 4,309,056 A | 1/1982 | Long |

(Continued)

FOREIGN PATENT DOCUMENTS

| | | |
|---|---|---|
| CA | 76555 A | 7/1902 |
| CA | 64701 A | 11/1989 |

OTHER PUBLICATIONS

AVS, Ventvisor® Deflector, www.autoventshade.com/products/ventvisor.html; Oct. 4, 2004, 2 pages.

(Continued)

*Primary Examiner* — Pinel E Romain
(74) *Attorney, Agent, or Firm* — Knobbe, Martens, Olson & Bear, LLP

(57) ABSTRACT

A side window visor designed to attach to a vehicle window channel. The side window visor can be arranged and configured to extend over a portion of a window area for preventing inclement weather from entering the passenger cabin with the window slightly opened. A full length tab is reduced to form a plurality of tabs along the tab area of a side window visor. The plurality of tabs located on the side window visor allows the auto-up window feature to be used without causing large resistance and retraction of the window.

20 Claims, 11 Drawing Sheets

(56) References Cited

U.S. PATENT DOCUMENTS

| | | | |
|---|---|---|---|
| 4,347,781 | A | 9/1982 | Hassell |
| 4,423,668 | A | 1/1984 | Long |
| 4,476,774 | A | 10/1984 | Liberto et al. |
| 4,685,718 | A | 8/1987 | Steenblik et al. |
| 4,700,980 | A | 10/1987 | Josefczak |
| 4,756,242 | A | 7/1988 | Keith |
| 4,842,320 | A | 6/1989 | Kingsley |
| 4,844,529 | A | 7/1989 | O'Saben |
| 4,923,241 | A | 5/1990 | Miller |
| D312,238 | S | 11/1990 | Lund |
| 5,042,551 | A | 8/1991 | Ein et al. |
| 5,114,205 | A | 5/1992 | Jee |
| 5,150,941 | A | 9/1992 | Silzer et al. |
| 5,251,953 | A | 10/1993 | Willey |
| 5,460,425 | A | 10/1995 | Stephens |
| D375,068 | S | 10/1996 | Lund |
| 5,676,418 | A | 10/1997 | Strefling |
| 5,683,293 | A | 11/1997 | Mohammad |
| 5,797,645 | A | 8/1998 | Schenk et al. |
| 6,019,414 | A | 2/2000 | Pourciau, Sr. |
| 6,042,473 | A | 3/2000 | McClary |
| 6,350,195 | B1 | 2/2002 | Iino |
| 6,557,927 | B2 | 5/2003 | Kanie |
| D478,303 | S | 8/2003 | Iverson et al. |
| D478,538 | S | 8/2003 | Iverson et al. |
| 6,682,126 | B2 | 1/2004 | Kanie |
| 7,131,683 | B1 | 11/2006 | Gong |
| 7,172,240 | B1 | 2/2007 | Kaufman |
| 7,589,622 | B2 | 9/2009 | Farley |
| 7,762,876 | B2 | 7/2010 | McClary |
| 2007/0001480 | A1 | 1/2007 | Yamada |

OTHER PUBLICATIONS

AVS; Aerovisor®, www.autoventshade.com/products/aerovisor.html; Oct. 4, 2004; 1 page.

AVS; Qwik-Snap Ventvisor®, www.autoventshade.com/prociucts/ventvisor-02.html; Oct. 4, 2004; 1 page.

AVS; Owik-Snap Ventvisor®, www.autoventshade.com/products/ventvisor-02.html; Oct. 4, 2004; 1 page.

AVS; Ventshade® Deflector, www.autoventshade.com/products/ventshade.html; Oct. 4, 2004; 1 page.

AVS; Ventvisor Deflector, Quick and Easy Installation Instructions; 3 pages.

Belmor, Inc. A Brand of Lund International; Belmore Heavy Truck Products; Ventshades, 1 page (Copyright 2002).

Belmor, Inc., A Brand of Lund International; Belmore Heavy Truck Products; Venta-lator; 1 page (Copyright 2002).

EGR, In-Channel SlimLine Visor; http://www.egrauto.com/eng/swf/container.html; Sep. 30, 2004; 1 page.

EGR, SlimLine WindowVisor; http://www.egrauto.com/eng/swf/container.html; Sep. 30, 2004; 1 page.

G.T. Styling; Side Window Deflectors . . . , Ventgard; www.gtstyling.com/vehicle-products.cfm?Ventgard&Group=Side%5Fwindow%5Fdefle . . . ; Sep. 30, 2004; 1 page.

G.T. Styling; Side Window Deflectors, Sportstream; www.gtstyling.com/vehicle-products.cfm?Sportstream&Group=Side%5Fwindow%5Fde . . . ; Sep. 30, 2004, 1 page.

G.T. Styling; Side Window Deflectors, Sportstream; www.gtstyling.com/vehicle-products.cfm?Sportstrearn&Group=Side%5Fwindow%5Fde . . . ; Sep. 30, 2004, 1 page.

G.T. Styling; Side Window Deflectors, www.gtstyling.com/products.cfm?Group=Side-window-deflectors; Sep. 30, 2004, 1 page.

G.T. Styling; Taillight Covers . . . , Sportgard; www.gtstyling.com/vehicle-products.cfm?Sport&Group=Side%5Fwindow%5Fdefle . . . ; Sep. 30, 2004, 1 page.

G.T. Styling; Taillight Covers . . . , Sportgard; www.gtstyling.com/vehicie-products.cfm?Sport&Group=Side%5Fwindow%5Fdefle . . . ; Sep. 30, 2004, 1 page.

Lund International, Chameleon, Qwik-Snap(TM) Window Vents; 1 page (Copyright 2004).

Lund International, Chameleon, Qwik-Snap™ Window Vents; 1 page (Copyright 2004).

Lund, International; Eclipse, In-Channel Snap(TM) Window Vents; 1 page (Copyright 2004).

Lund, International; Eclipse, In-Channel Snap™ Window Vents; 1 page (Copyright 2004).

Lund; International; Eclipse; Qwik-Snap(TM) Window Vents; 1 page (Copyright 2004).

Lund, International; Eclipse, Qwik-Snap™ Window Vents; 1 page (Copyright 2004).

Lund, International; Eclipse, Window Vents; 1 page. (Copyright 2004).

WeatherFlectors Side Window Deflectors—WeatherTech® MacNeil Automotive Accessories; WeatherFlectors(TM), Ventilation made easy, rain or shine, while parked or in motion!, www.weathertech.com/store/prodsearch.asp?item-group-id=4; Sep. 30, 2004; 1 page.

WeatherFlectors Side Window Deflectors—WeatherTech® MacNeil Automotive Accessories; WeatherFlectors™, Ventilation made easy, rain or shine, while parked or in motion!, www.weathertech.com/store/prodsearch.asp?item—group—id=4; Sep. 30, 2004; 1 page.

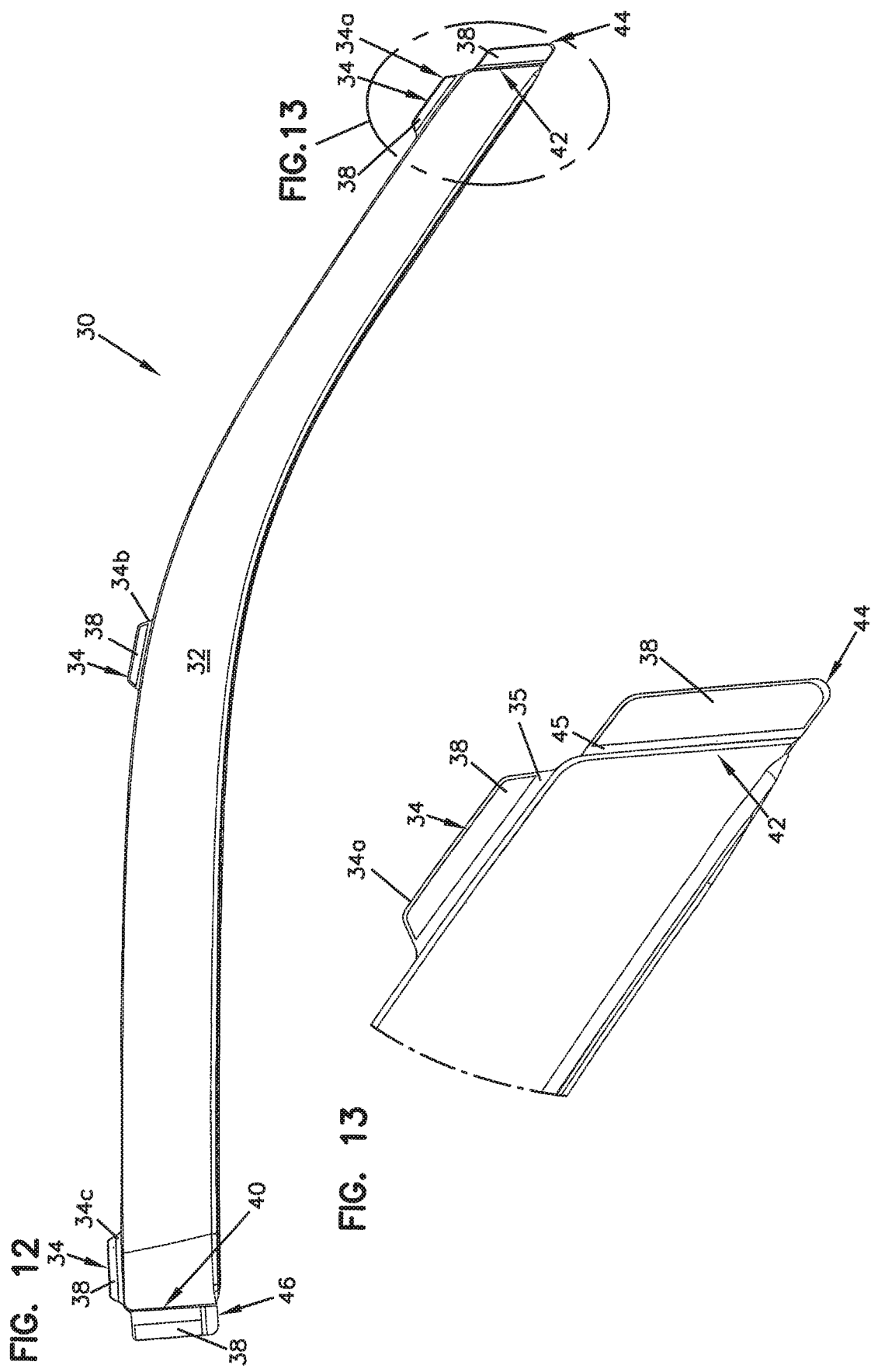

SIDE WINDOW VISOR, A METHOD OF INSTALLATION, AND A MOTOR VEHICLE HAVING A SIDE WINDOW VISOR

CROSS REFERENCE TO RELATED APPLICATION

This application is a continuation of U.S. application Ser. No. 15/791,159 that was filed with the U.S. Patent and Trademark Office on Oct. 23, 2017, which is a continuation of U.S. application Ser. No. 14/679,131 that was filed with the U.S. Patent and Trademark Office on Apr. 6, 2015, which is a continuation of U.S. application Ser. No. 13/524,953, now issued as U.S. Pat. No. 8,998,290, that was filed with the U.S. Patent and Trademark Office on Jun. 15, 2012. The entire disclosure of U.S. application Ser. Nos. 13/524,953 and 14/679,131 are incorporated herein by reference. A claim of priority is made to U.S. application Ser. Nos. 13/524,953 and 14/679,131.

FIELD OF THE INVENTION

The invention relates to a side window visor for a motor vehicle, a method of installing a side window visor on a motor vehicle, and a motor vehicle having a side window visor.

BACKGROUND

Side window visors are sometimes referred to as vent visors and wind deflectors. Side window visors have been used to decrease the amount of wind noise that results from opening a side window while the vehicle is in motion, shade portions of the interior of the vehicle from the sun, and prevent precipitation from entering a partially opened window. Side window visors can be helpful in expunging undesirable odors, such as cigarette smoke, from the interior of the vehicle; reducing window fogging; and maintaining a relatively cool interior even when the vehicle's cooling system are turned off, such as when the vehicle is parked and the engine is not running.

Another advantage of a side window visor is that it may decrease the noise level created by the wind while driving a motor vehicle with the windows slightly open. The side window visor allows fresh air to be circulated within the passenger compartment of a motor vehicle while providing shielding from rain.

Side window visors are commonly fastened to the exterior of a vehicle doorframe via mechanical fasteners such as clips, bolts, screws, and the like. See, for example, U.S. Pat. No. 4,558,633 to Lingg; U.S. Pat. No. 5,797,645 to Schenk et al.; and U.S. Pat. No. 6,682,126 to Kanie. Alternative side window visors are available that can be attached to vehicles without the need of mechanical hardware such as clips, screws and bolts. Two types of side window visors are commonly known, an in-channel side window visor and an external side window visor. The in-channel side window visor can be mounted using adhesive inside a window channel of a vehicle. The external side window visor can be mounted using screws and bolts or adhesive to the exterior of a vehicle.

Side window visors have been made of acrylic, although side window visors may conceivably be manufactured from various other plastics and lightweight metals. Side window visors are designed to easily be attached to a vehicle door. Some side window visors mount directly to the frame of the vehicle door using double-sided acrylic foam tape, while other side window visors are installed in the window channel. See, for example, U.S. Pat. No. 4,685,718 to Steenblik et al.

Several vehicle manufacturers have recently introduced the safety features on windows. In order to prevent injury during the operation of auto-up windows, the vehicle manufacturers have incorporated a safety feature where the window retracts back down if the window experiences sufficient resistance during the operation of the auto-up feature. Presently available in-channel style visors have a tendency to increase resistance when closing a window during auto-up thereby triggering the safety feature.

SUMMARY

The present invention provides a solution to in-channel visors that interfere with a vehicle's electrical system when activating the auto-up feature of a window. The invention is a side window visor that incorporates a design with a plurality of tabs thereby reducing the flange length unlike existing in-channel designs that incorporate a full flange length. The side window visor according to the present invention enables the window to fully close without retracting back down while using the auto-up feature. The invention also relates to a method for installing the side window visor to a motor vehicle.

The side window visor includes a visor body having an upper window gasket running length that is constructed to follow an upper edge of a vehicle window gasket and extend from a visor body leading edge to a visor body trailing edge. A plurality of tabs extend from the visor body upper window gasket running length. The plurality of tabs are spaced from each other by gaps and adhesive tape is provided along the plurality of tabs.

A motor vehicle and side window visor includes a vehicle door frame having a window frame, a window gasket, and a window channel. The window frame defines an opening for the window gasket to fit and forms the window channel. The window channel is configured to receive a window and the side window visor is adhered within the window channel of the vehicle door frame. The side window visor includes a visor body having an upper window gasket running length that is constructed to follow an upper edge of a vehicle window gasket extending from a visor body leading edge to a visor body trailing edge. A plurality of tabs extend from the visor body upper window gasket running length where the plurality of tabs are spaced from each other by gaps and adhesive tape is provided along the plurality of tabs.

A method of mounting a side window visor on a vehicle door includes adhering the side window visor into a window channel of the vehicle door. The side window visor includes a visor body having an upper window gasket running length and is constructed to follow an upper edge of a vehicle window gasket and extend from a visor body leading edge to a visor body trailing edge. A plurality of tabs extend from the visor body upper window gasket running length and the plurality of tabs are spaced from each other by gaps.

BRIEF DESCRIPTION OF DRAWINGS

FIG. 12 is a perspective view of an alternative embodiment of a side window visor according to the principles of the present invention;

FIG. 13 is a partial enlarged view of a portion of the side window visor of FIG. 12.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
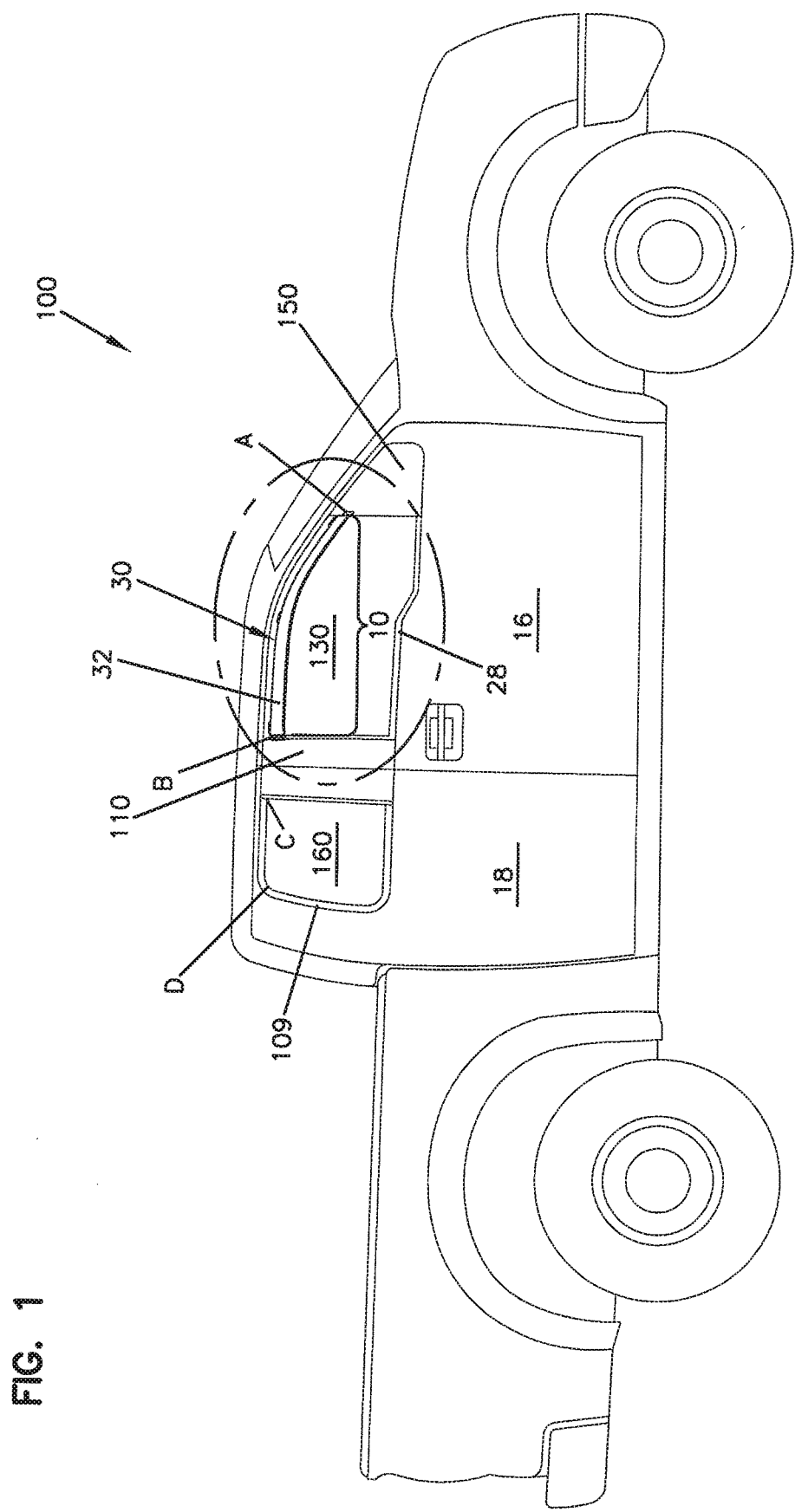
FIG. 1 is a side elevational view of a vehicle having a side window visor mounted thereon according to the principles of the present invention.

Referring now to FIG. 1, a side window visor 30 is shown mounted to a motor vehicle 100. The side window visor 30 can be characterized as an in-channel style visor. An in-channel style visor is one that mounts inside a window channel. The side window visor 30 is an in-channel style visor that does not mount to the exterior of a vehicle. The exterior of a vehicle refers to the portion of the vehicle outside of the window channel. The window channel is the portion of the vehicle that receives the window when the window is fully up. FIG. 1 shows the side window visor 30 installed on a vehicle 100 mounted inside a window channel. It is to be understood that motor vehicles vary and as such, vehicle 100 is only representative. In vehicle 100, there is depicted a window gasket 28, a window frame 110, a side passenger window 130, and a mirror cap 150. The side window visor 30 follows the contour of the window gasket 28 between a forward edge A and a rearward edge B. This distance along the upper edge of the visor between the forward edge A and the rearward edge B can be referred to as the upper window gasket running length 10. The side window visor 30 includes a visor body 32 having an upper window running length constructed to follow the upper edge of the window gasket 28. The side window visor 30 is shown mounted to a side passenger window 130 for illustrative purposes. It should be understood that a side window visor that is essentially a mirror image can be mounted to a driver's side window frame 111. Furthermore, side window visors having the same principles can be used for attaching to left and right rear window frames on a vehicle. The vehicle 100 is shown having a rear right side door 18 and a rear side window frame 109. A visor can be attached to the rear side window frame 109 following the upper window running length from edge C to edge D, if desired.

Referring now to FIGS. 2-5, the side window visor 30 includes a visor body 32 and a plurality of tabs 34 and is shown installed in a motor vehicle. The plurality of tabs 34 are illustrated as being outlined to indicate they are actually hidden and installed in a window channel of a vehicle 100.

Figure 2:
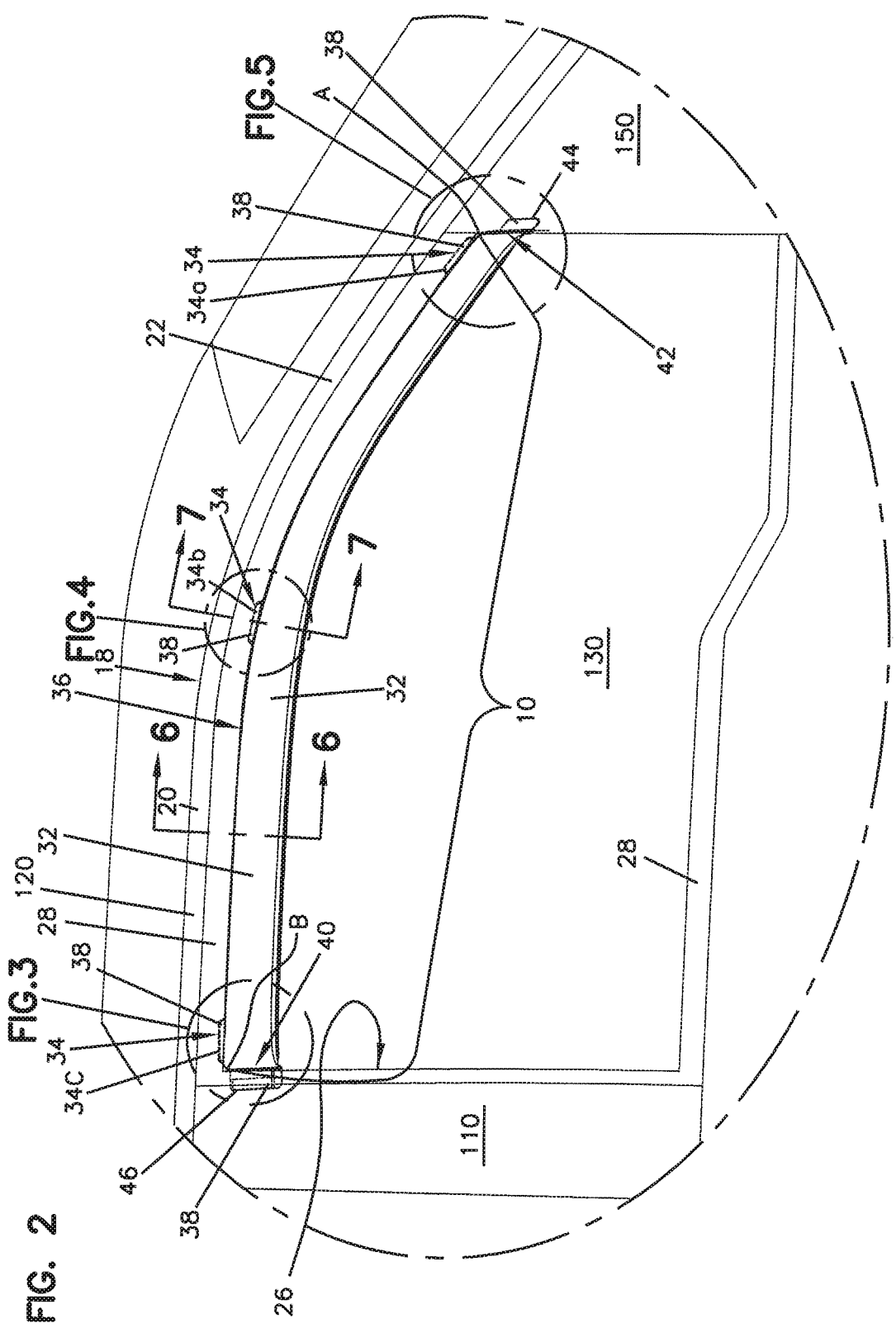
FIG. 2 is an enlarged view of a portion of the vehicle and side window visor shown in FIG. 1.
Figure 3:
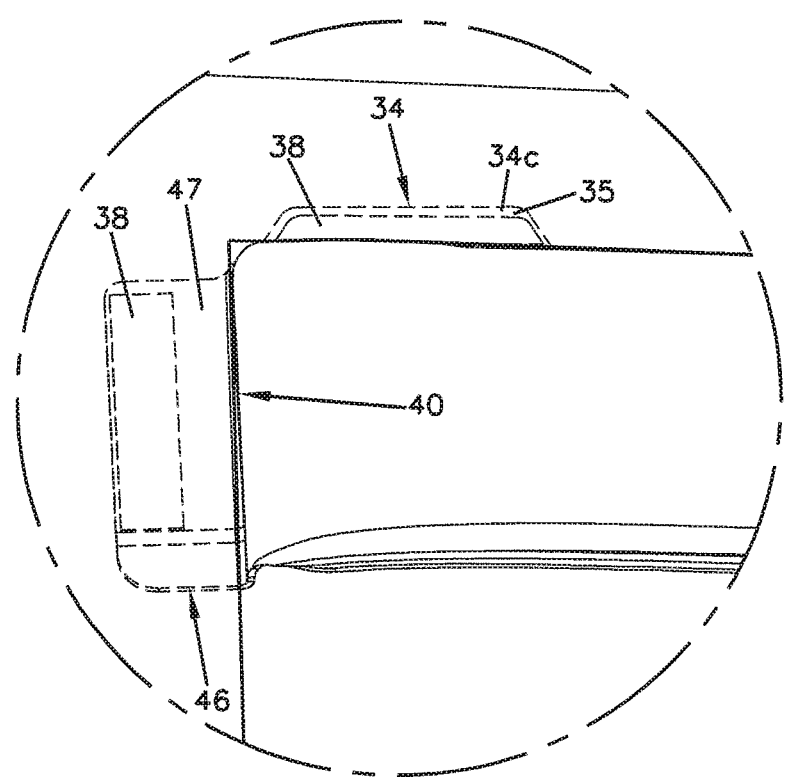
FIG. 3 is an enlarged view of a trailing portion of the vehicle and side window visor shown in FIG. 2.
Figure 4:
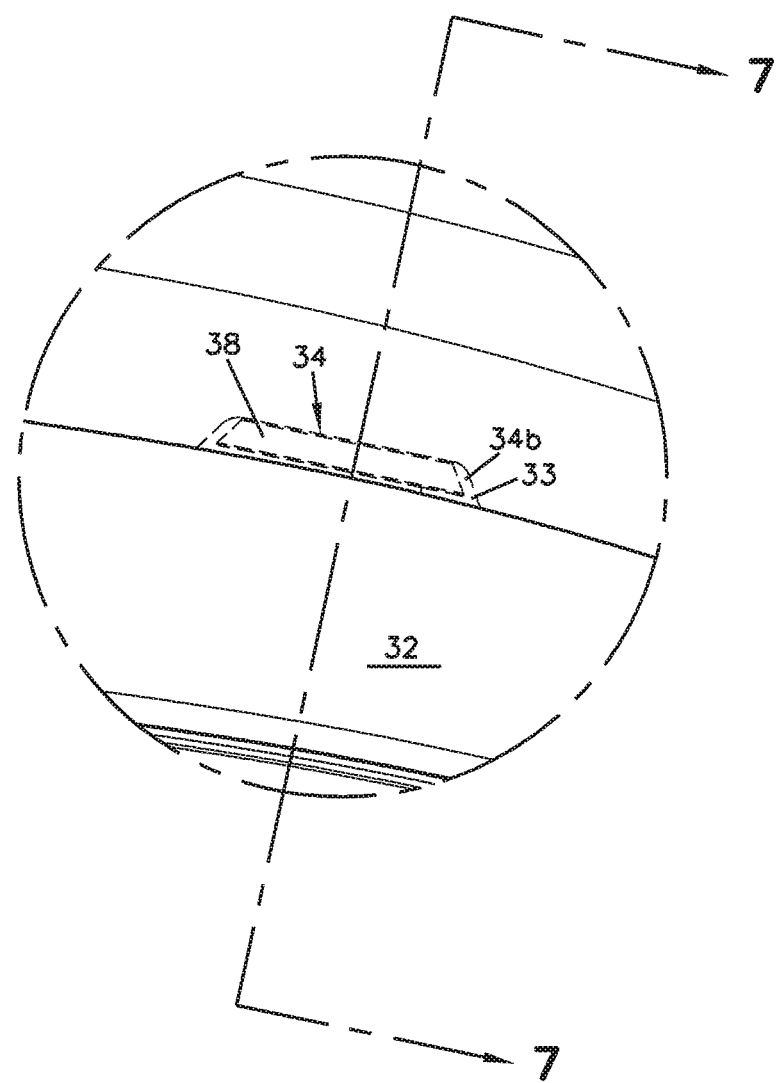
FIG. 4 is an enlarged view of a middle portion of the vehicle and side window visor of FIG. 2.
Figure 5:
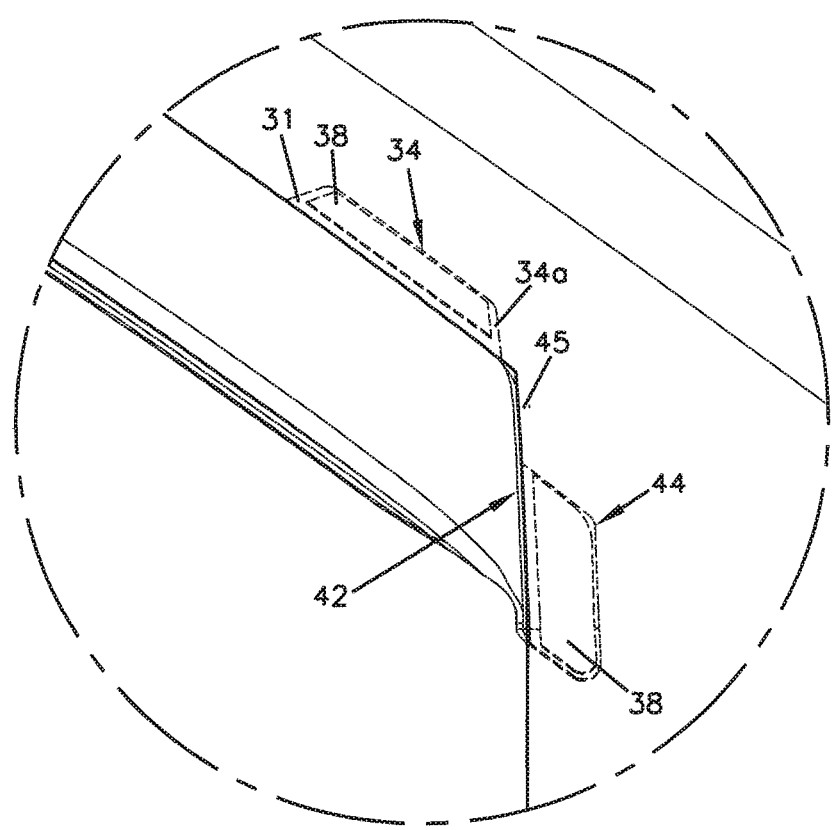
FIG. 5 is an enlarged view of a leading portion of the vehicle and side window visor of FIG. 2.

FIG. 2 shows a door frame 120 with a top edge 18 and two substantially straight portions 20 and 22, which are angled with respect to one another. More specifically, FIG. 2 shows a window gasket 28. The visor body 32 includes an upper window gasket running length 10 having a trailing edge 40 and a leading edge 42. The upper window gasket running length 10 is the distance along the upper edge of the visor from the forward edge A to the rearward edge B. Terminating from the trailing edge 40 is a rearward tab 46 and terminating from the leading edge 42 is a forward tab 44. The visor body 32 further includes a front tab 34a, a middle tab 34b, and a rear tab 34c to yield a plurality of tabs 34 integral with the visor body 32 and located along the tab area 36. The plurality of tabs 34 extend along the upper window gasket running length 10. The plurality of tabs 34 do not include the forward tab 44 or the rearward tab 46. The side window visor 30 can be adhered to the inside of the window channel 14 using double faced adhesive tape 38. An exemplary tape that can be used is 3M™ 5345 Automotive Tape. The adhesive tape 38 is placed on the plurality of tabs 34, the rearward tab 46 and the forward tab 44. The plurality of tabs 34 have a thickness that can be as thick as the visor body 32 or thinner than the visor body 32. The visor body 32 can be either thermoformed or injection molded.

In one embodiment, the visor body 32 has an upper window gasket running length 10 and is constructed to follow the top edge 18 of a door frame 120. The plurality of tabs 34 extend upwardly from the visor body 32 having an upper window gasket running length 10. By providing a plurality of tabs 34 with gaps 13 between the plurality of tabs 34, it is possible to reduce the interferences between the side window visor 30 and the side window 130 when the side window 130 engages the side window channel 26. Accordingly, by providing a plurality of tabs 34 spaced by gaps 13, the resistance between the side window visor 30 and the side window 130 can be significantly reduced so that the side window 130 can fully close during an "auto-up" and without triggering a safety feature, found on many vehicles, where the side window 130 retracts during "auto-up" if there is too much resistance. Furthermore, the plurality of tabs 34 provide sufficient surface area so that the side window visor 30 can be sufficiently secured in place within the window channel 14. The plurality of tabs 34 and gaps 13 there between can be characterized, if desired, based on the upper window gasket running length 10. For example, the plurality of tabs 34 can have a running length (the summation of the running length of the plurality of tabs 34) that is about 20% or less than the running length of the upper window gasket running length 10. This reduction in the running length helps reduce the interference between the side window visor 30 and the side window 130. The plurality of tabs 34 can have a running length that is sufficient to allow the side window visor 30 to remain in place in the window channel 14. This running length can depend on the aggressiveness of the adhesive or adhesive tape used to hold the side window visor 30 to the window channel 14. In general, it is expected that the running length of the plurality of tabs 34 can be at least about 10% of the upper window gasket running length 10. The plurality of tabs 34 can have a total running length that is about 10 percent to about 20 percent of the visor body 32 upper window gasket running length 10. Adhesive tape 38 can be provided on the outside 31, 33, 35 of the plurality of tabs 34, where the plurality of tabs 34 seat inside the window channel 14.

In another embodiment, the visor body 32 has an upper window gasket running length 10 and is constructed to follow the top edge 18 of a door frame 120. The side window visor 30 includes the plurality of tabs 34 that interface with the window channel 14 and the side window visor 30 includes the rearward tab 46 that extends from the trailing edge 40 and the forward tab 44 that extends from the leading edge 42. The forward tab 44 interfaces the window channel 14 and the rearward tab 46 interfaces the window channel 14. Adhesive tape 38 is provided on the outside 31, 33, 35 of the plurality of tabs 34, the outside 47 of the rearward tab 46 and the outside 45 of the forward tab 44, where the plurality of tabs 34, the rearward tab 46, and the forward tab 44 seat inside the window channel 14.

In another embodiment, the visor body 32 has an upper window gasket running length 10 and is constructed to follow the top edge 18 of a door frame 120. The side window visor 30 includes the plurality of tabs 34 that interface with the window channel 14 and the forward tab 44 interfaces the mirror cap 150 and the rearward tab 46 interfaces a side window channel 26. The plurality of tabs 34 have a total running length that is about 10 percent to about 20 percent of the visor body 32 upper window gasket running length 10. Here, the forward tab 44 and the rearward tab 46 are not mounted within the window channel 14. As such, the forward tab 44 and the rearward tab 46 can be positioned in the same plane as the plurality of tabs 34 or in a plane that is shifted from the plane of the plurality of tabs 34 such that the forward tab 44 and the rearward tab 46 do not engage the window. The forward tab 44 can be seated behind the mirror cap 150 and the rearward tab 46 can be seated within the side window channel 26.

The side window visor 30 discussed in the embodiments above is similar. The way the side window visor 30 is mounted would depend on the type of vehicle used. Nonetheless, the side window visor 30 is sufficient to fit vehicles having differently shaped door frames and windows. It should be understood that in alternative embodiments the plurality of tabs 34 can be configured differently than is shown in FIG. 2. For example, the plurality of tabs 34 can be separated by smaller spaces while maintaining the same total running length that is about 10 percent to about 20 percent of the visor body 32 upper window gasket running length 10.

In addition, the forward tab 44 can be configured with a different tab length as shown in FIGS. 12-13. To adjust the tab length provides flexibility of the side window visor 30 to fit vehicles having differently shaped door frames 120 or window gasket 28. It should be appreciated that many other alternative embodiments for the plurality of tabs 34, the forward tab 44 and the rearward tab 46 are possible.

Figure 6:
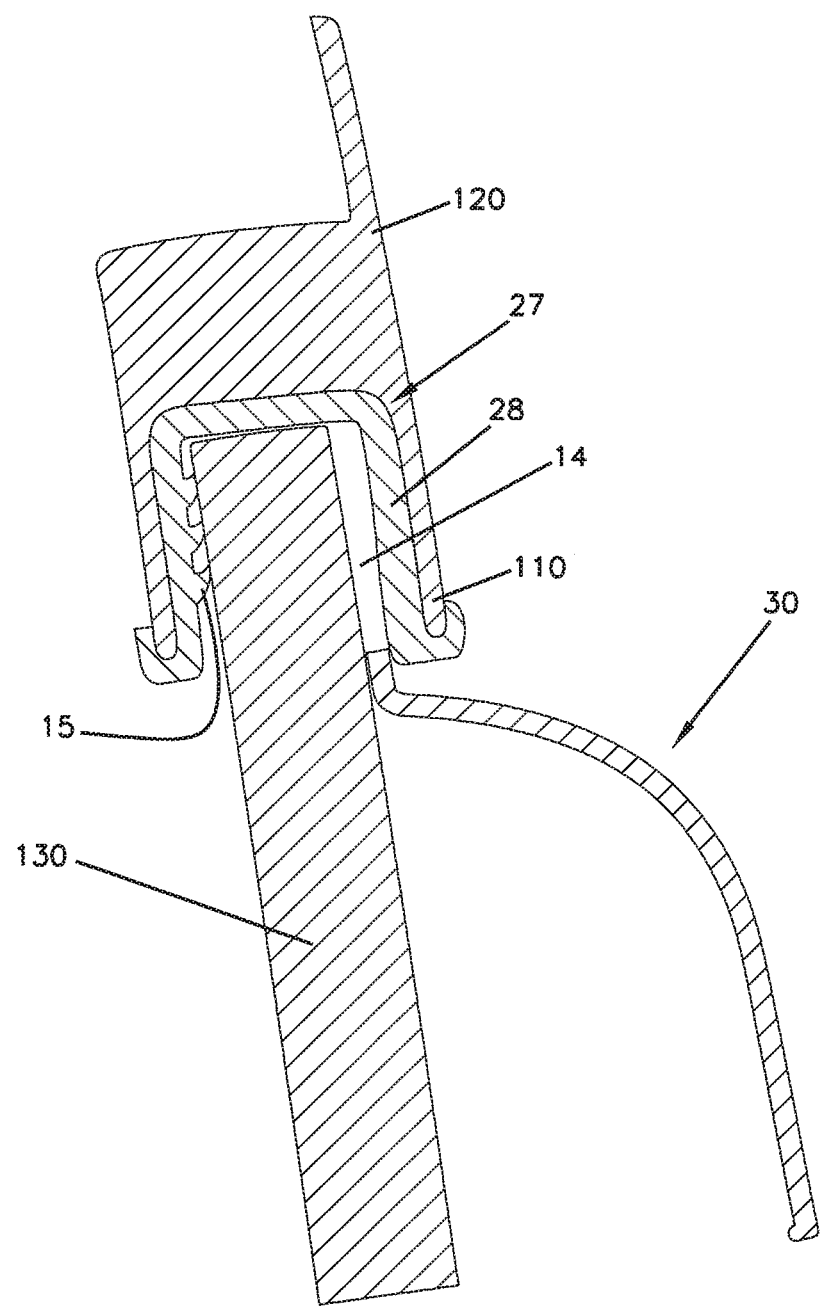
FIG. 6 is a cross-sectional view of the vehicle door and side window visor of FIG. 2 taken along line 6-6.

Referring now to FIG. 6, is a cross-sectional view taken along line 6-6 of FIG. 2 shown. FIG. 6 shows the door frame 120 and the window frame 110 including a passage that creates a gasket opening 27. The gasket opening 27 forms a window gasket 28 with lip seals 15 to create the window channel 14 and receives the side passenger window 130 and the side window visor 30.

Figure 7:
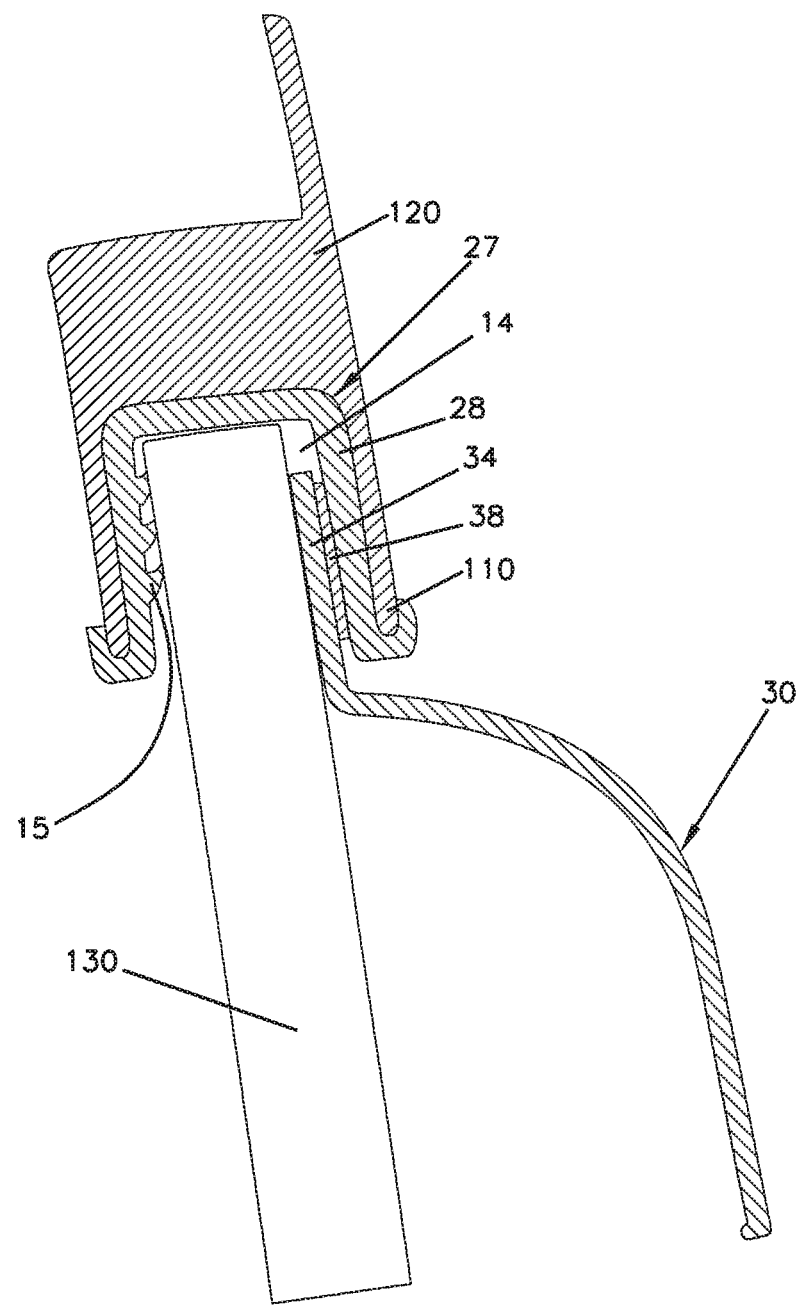
FIG. 7 is a cross-sectional view of the vehicle door and side window visor of FIG. 2 taken along line 7-7.

Referring now to FIG. 7, a cross-sectional view taken along line 7-7 of FIG. 2 is shown. The door frame 120 and the window frame 110 are depicted with a passage that creates a gasket opening 27. The gasket opening 27 forms the window gasket 28 with lip seals 15 to create the window channel 14 and receives the side passenger window 130 and the side window visor 30. FIG. 7 shows the middle tab 34b mounted inside a window channel 14. The middle tab 34b has adhesive tape 38 attached on the outside 33. The adhesive tape 38 engages the window channel 14 to secure the side window visor 30 therein.

Figure 8:
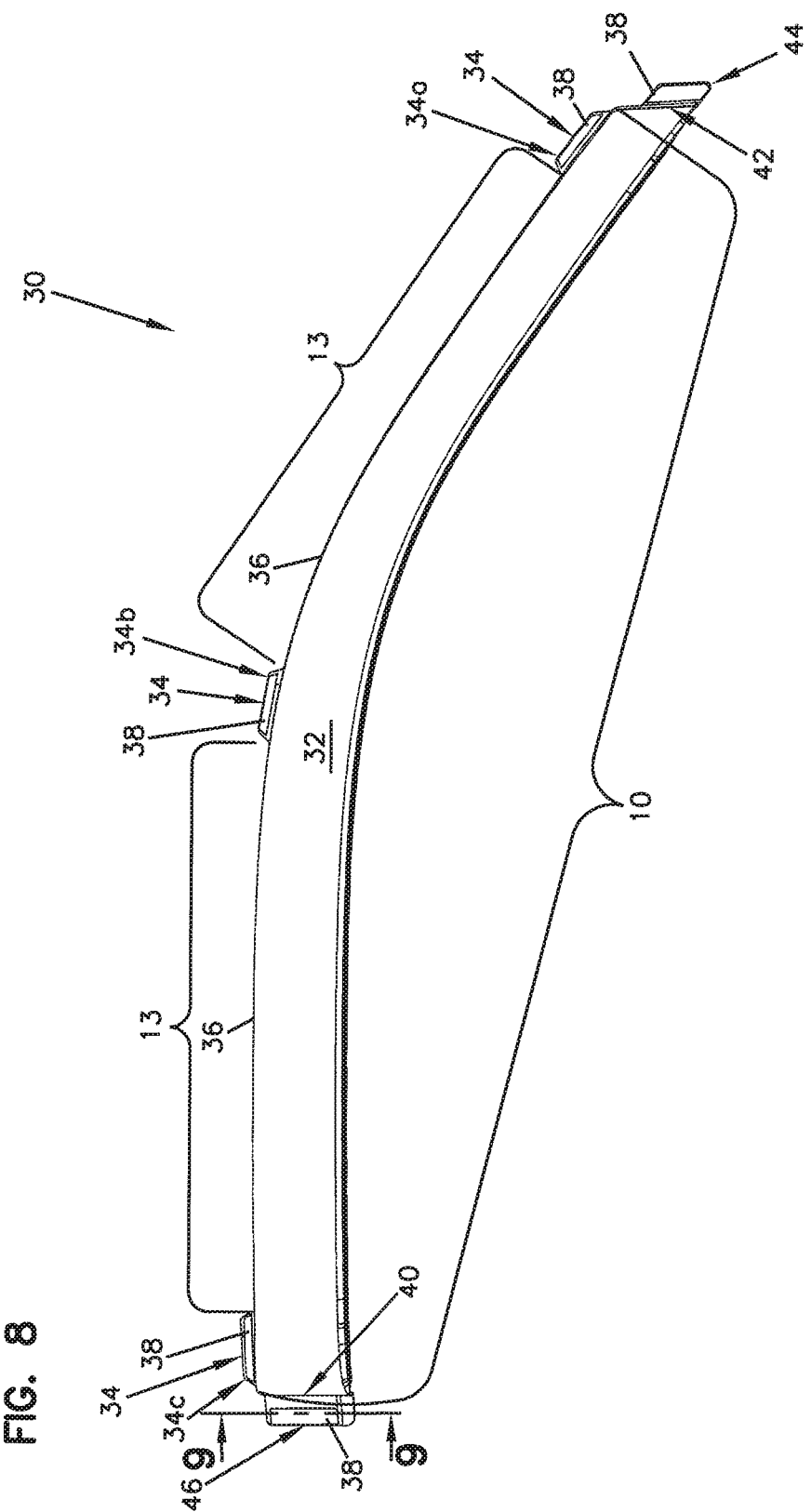
FIG. 8 is a perspective view of the side window visor of FIG. 1.

Referring now to FIG. 8, a front view of the side window visor 30 is shown. The side window visor 30 has an upper window gasket running length 10. The visor body 32 includes the rearward tab 46 that extends from the trailing edge 40 and the forward tab 44 that extends from the leading edge 42. The gaps 13 are shown between the plurality of tabs 34 along the tab area 36. Adhesive tape 38 is shown applied to the plurality of tabs 34, the forward tab 44 and the rearward tab 46. The adhesive tape 38 can be approximately 5 mm wide for the plurality of tabs 34 and 10 mm wide for both the forward tab 44 and the rearward tab 46.

Figure 9:
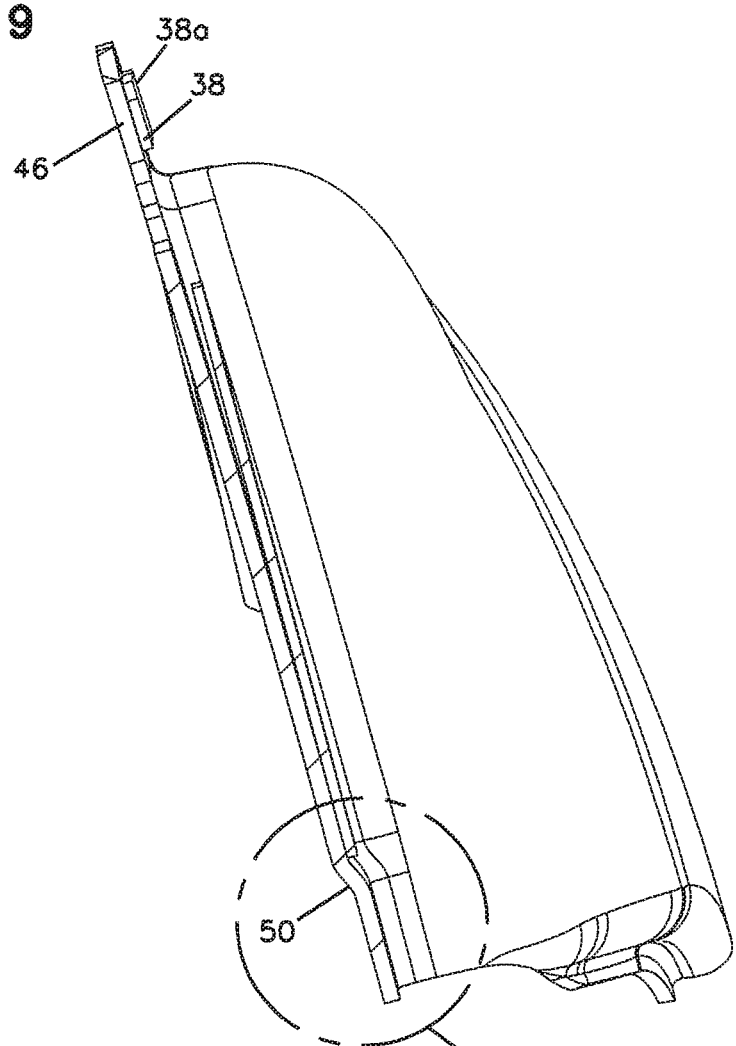
FIG. 9 is a cross-sectional view of the visor of FIG. 8 taken along line 9-9.
Figure 10:
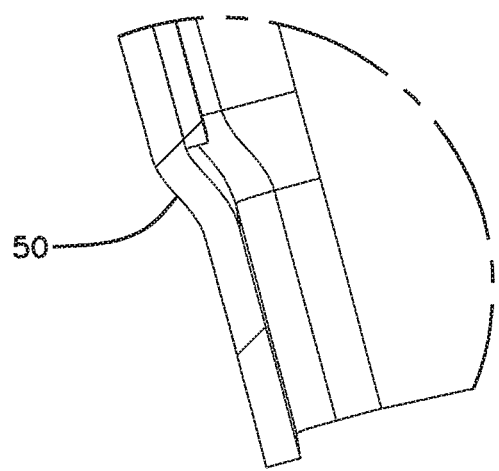
FIG. 10 is a partial enlarged view of a portion of the visor of FIG. 9.

Referring now to FIGS. 9-10, a cross-sectional view taken along line 9-9 of FIG. 8 is depicted. The side window visor 30 depicts a cross-sectional view towards the trailing edge 40 to show an offset 50 at the lower end of the rearward tab 46. The offset 50 bumps approximately 0.04 mm outward below the rearward tab 46 to help funnel the window 130 when traveling past the side window visor 30. The height of the offset 50 can be approximately 0.43 mm. FIG. 10 is a partial enlargement of FIG. 9 showing the offset 50.

Figure 11:
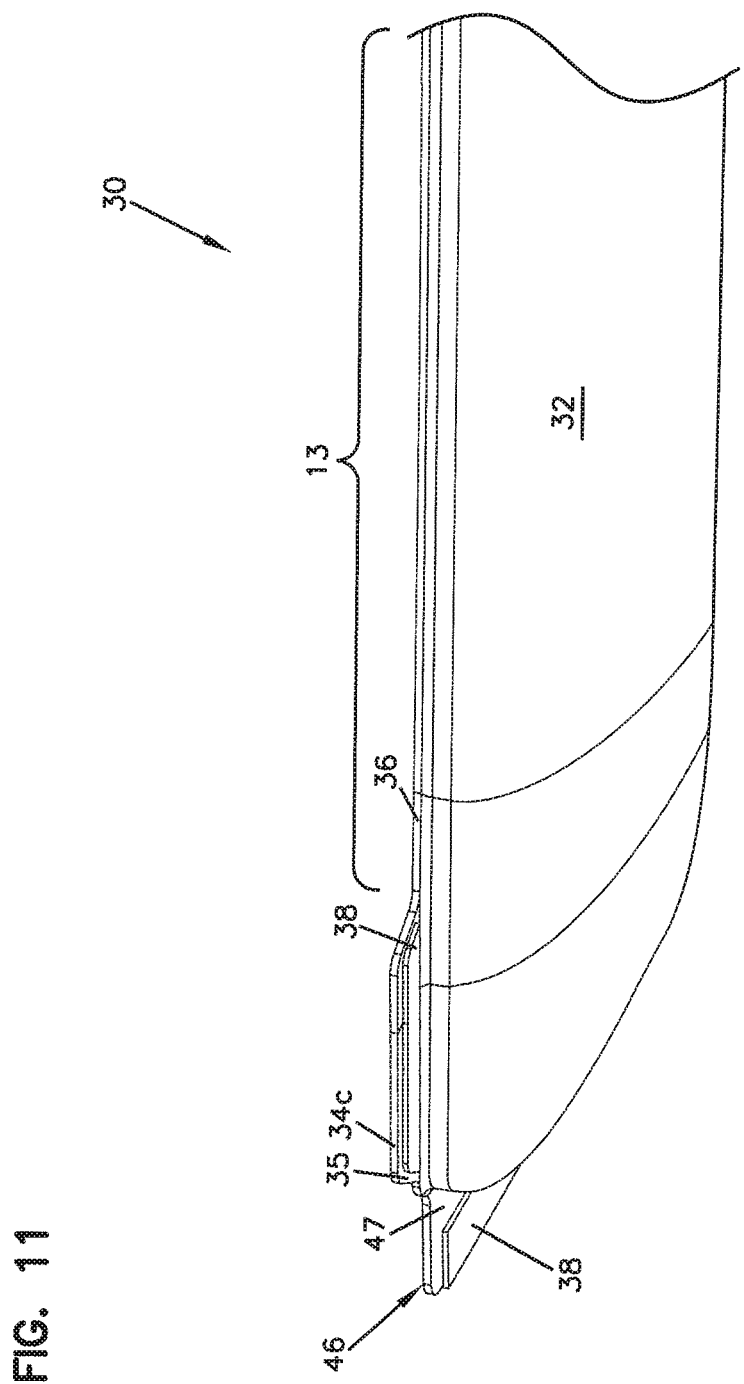
FIG. 11 is a top view of a portion of the side window visor of FIG. 9.

Referring now to FIG. 11, a top view of a portion of the side window visor 30 is shown. The rear tab 34c project out from the tab area 36 and the rearward tab 46 extends from the trailing edge 40 of the side window visor 30. Adhesive tape 38 can be applied to the outside 47 of the rearward tab 46 and to the outside 35 of the rear tab 34c. The adhesive tape 38 can be approximately 5 mm wide for rear tab 34c and approximately 10 mm wide for the rearward tab 46. The adhesive tape 38 can be used to maximize retention to the window channel 14.

The method of mounting a side window visor 30 onto a vehicle 100 includes an adhesive tape 38, double stick tape, that can be applied to the plurality of tabs 34. A liner 38a on the adhesive tape 38 remains on the plurality of tabs 34 to be removed prior to installation. The rearward tab 46 and the forward tab 44 each can include adhesive tape 38 on the outside 47, 35. Prior to installing the side window visor 30 the liner 38a on the adhesive tape 38 is removed. The side window visor 30 can be aligned to the visor body 32 upper window gasket running length 10 to properly position the side window visor 30. The exposed adhesive tape 38 faces away from the vehicle 100. The side window visor 30 can be slideably guided to allow the plurality of tabs 34 to engage the window channel 14 and rests therein. The side window visor 30 can be firmly pulled against the window channel 14 to compress the adhesive tape 38 firmly against the window channel 14 thereby fixing the side window visor 30 to the vehicle 100.

A side window visor 30 according to the principles of the present invention can be made from a plastic material, such as a thermoplastic material. The side window visor 30 can be made using conventional techniques, including injection molding, injection blow molding, compression molding, injection stretch molding, composite injection molding, roto-molding, and the like. It is understood that the side window visor 30 can be molded by thermoforming or injection molding. The thermoplastic material includes a variety of materials, including, but not limited to, polycarbonates, acrylics, polystyrenes, polypropylenes, and mixtures thereof. In an embodiment, the side window visor 30 can be formed from a thermoplastic sheet which has been pre-cut or in the form of a continuous web or roll formed. Preferably the side window visor 30 can be made of acrylic material.

The side window visor 30 can be thermoformed from a uniform sheet of material, preferably acrylic, to obtain a uniform profile with a thickness of approximately 0.05 inches. The side window visor 30 may be thinner when it is formed from an injection mold process. For example, when using an injection molding process the side window visor 30 can have a thickness of approximately 0.07 inches and the plurality of tabs 34 can have a thickness of approximately 0.05 inches. On the other hand, using a thermoforming process the side window visor 30 and the plurality of tabs 34 both can have a thickness of approximately 0.05 inches.

According to the present disclosure, the side window visor 30 may include a forward tab 44 and a rearward tab 46 that extend the width of the side window visor 30. The forward tab 44 and the rearward tab 46 provide stability to the side window visor 30 while inside the window channel 14 to prevent rocking or any motion that would cause interference with a vehicle window. In addition, the side window visor 30 also includes a tab area 36 that has gaps 13 between a plurality of tabs 34 along the tab area 36. The side window visor 30 is designed to be rid of the full length tab that extends along the tab area 36 as seen with conventional side window visors. The side window visor includes a plurality of tabs 34 along the tab area 36 that significantly reduces the full length tab. The side window visor 30 provides for less material in the tab area 36 which helps to allow the functionality of the auto-up feature of a window without having it retract back down. Furthermore, the forward tab 44 can also help to allow the functionality of the auto-up feature of a window. Therefore, the plurality of tabs 34 and the forward tab 44 both can impact the operation of the auto-up feature. The plurality of tabs 34 can have a typical width of approximately 7.8 mm and a typical thickness of approximately 1.4 mm.

The present disclosure describes a side window visor 30 that can have approximately 87% open space in the tab area 36 to provide and maintain the functionality of the auto-up feature in a window channel 14. In other words, the side window visor 30 includes approximately 13% total tab material for the plurality of tabs 34 arranged and configured in the tab area 36. Less open space may be required for the rear side window 160, which is likely due to the electrical manufacturing differences between a front side window and a rear side window. Therefore, approximately 18% total tab material can be present on a visor fitted for the rear side window 160. Despite having a bulk of material removed from the tab area 36, the side window visor 30 can be securely held within the window channel 14. The combination of the plurality of tabs 34 in the tab area 36, the forward tab 44, and the rearward tab 46 provide a design efficient to hold the side window visor 30 in place.

The side window visor 30 includes a visor body 32 having the plurality of tabs 34 extending from the visor body 32. The plurality of tabs 34 can have a total running length that is about 10% to about 20% of the visor body upper window gasket running length. It is observed that the percentage of material could change as a function of tab thickness or adhesive tape thickness. For example, thinning the adhesive tape 38 can provide an increased amount of tab material on the side window visor 30. Thinning of the tab generally can decrease the amount of tab material present on the side window visor 30. Therefore, thinning of the adhesive tape 38 or the tab would change the ratio of tab material to gaps 13 in the tab area 36. Furthermore, it should be appreciated that the type of vehicle may also alter the thickness and therefore the percentage of tab material. As one in the art may know, many configurations or variations of the disclosure may be utilized.

The plurality of tabs 34, the forward tab 44, and the rearward tab 46 can each have an inside surface and an outside surface. Adhesive tape 38 can be applied to the outside 31, 33, 35 of each of the plurality of tabs 34, the outside 45 of the forward tab 44, and the outside 47 of the rearward tab 46. The adhesive tape 38 can be approximately 0.8 mm thick and covers the outsides 31, 33, 35 of the plurality of tabs 34, the outside 45 of the forward tab 44, and the outside 47 of the rearward tab 46. The adhesive tape 38 can have a width of at least approximately 6 mm to approximately 10 mm. The adhesive tape 38 can be 5 mm wide and can maximize retention to the window channel 14.

While this invention has been particularly shown and described with references to preferred embodiments thereof, it will be understood by those skilled in the art that various changes in form and details may be made therein without departing from the scope of the invention encompassed by the appended claims. The drawings are not necessarily to scale, emphasis instead being placed upon illustrating the principles of the invention and other modifications within the scope. Any such modifications or variations that fall within the purview of this description are intended to be included therein as well. It is understood that the description herein is intended to be illustrative only and is not intended to be limitative.

What is claimed is:

1. A side window visor for use on a vehicle having a front end, a back end, a window frame, a window gasket, a window channel, and a window constructed to move between an open position and a closed position within the window channel, the side window visor comprising:
   a visor body having a leading end, a trailing end opposite the leading end, an upper edge, and a lower edge opposite the upper edge, the upper and lower edges extending between the leading and trailing ends of the visor body, wherein the upper edge of the visor body is constructed to extend along an upper edge of the window gasket of the vehicle when the side window visor is in use;
   a first tab extending from the leading end of the visor body; and
   a second tab extending from the trailing end of the visor body.

2. The side window visor of claim 1, wherein the first and second tabs are configured to secure to portions of the window channel of the vehicle.

3. The side window visor of claim 1, wherein the first and second tabs comprise adhesive tapes positioned on outside surfaces thereof.

4. The side window visor of claim 3, wherein the adhesive tapes are double sided.

5. The side window visor of claim 1, wherein the first tab is configured to secure to a mirror cap of the vehicle and the second tab is configured to secure within a side window channel of the vehicle.

6. The side window visor of claim 1, wherein the first and second tabs extend a width of the side window visor.

7. The side window visor of claim 1, wherein a lower end of the second tab comprises an offset configured to funnel the window when the window moves past a portion of the side window visor.

8. The side window visor of claim 1, wherein the first and second tabs are integral with the visor body.

9. The side window visor of claim 1, wherein the second tab is configured to secure to a door channel seal.

10. The side window visor of claim 1, wherein the visor body comprises a uniform profile.

11. The side window visor of claim 1, wherein the visor body and the first and second tabs comprise acrylic.

12. A vehicle, the vehicle comprising:
- a front end, a back end, a window frame, a window gasket, a window channel configured to receive a window, the window configured to move between an open position and a closed position within the window channel of the vehicle; and
- a side window visor comprising:
  - a visor body having a leading end, a trailing end opposite the leading end, an upper edge, and a lower edge opposite the upper edge, the upper and lower edges extending between the leading and trailing ends of the visor body, wherein the upper edge of the visor body is constructed to extend along an upper edge of the window gasket of the vehicle when the side window visor is in use;
  - a first tab extending from the leading end of the visor body; and
  - a second tab extending from the trailing end of the visor body.

13. The vehicle of claim 12, wherein the first and second tabs are configured to secure to portions of the window channel of the vehicle.

14. The vehicle of claim 12, wherein the first and second tabs comprise adhesive tapes positioned on outside surfaces thereof.

15. The vehicle of claim 12, wherein the first tab is configured to secure to a mirror cap of the vehicle and the second tab is configured to secure within a side window channel of the vehicle.

16. The vehicle of claim 12, wherein a lower end of the second tab comprises an offset configured to funnel the window when the window moves past a portion of the side window visor.

17. The vehicle of claim 12, wherein the second tab is configured to secure to a door channel seal.

18. The vehicle of claim 12, wherein the visor body comprises a uniform profile.

19. The vehicle of claim 12, wherein the first and second tabs extend a width of the side window visor.

20. The vehicle of claim 12, wherein the first and second tabs are integral with the visor body.

* * * * *

UNITED STATES PATENT AND TRADEMARK OFFICE
CERTIFICATE OF CORRECTION

PATENT NO. : 10,675,953 B2
APPLICATION NO. : 16/272607
DATED : June 9, 2020
INVENTOR(S) : Luis H. Serentill and John A. Wargo It is certified that error appears in the above-identified patent and that said Letters Patent is hereby corrected as shown below:

On Page 2, Column 1, Item (56), Line 3, under Other Publications, delete "prociucts/" and insert --products/--.

On Page 2, Column 2, Item (56), Line 16, under Other Publications, delete "Sportstrearn" and insert --Sportstream--.

On Page 2, Column 2, Item (56), Line 24, under Other Publications, delete "/vehicie-" and insert --/vehicle- --.

Signed and Sealed this
Eighth Day of September, 2020

Andrei Iancu
*Director of the United States Patent and Trademark Office*